(12) United States Patent
Yoon et al.

(10) Patent No.: US 12,442,754 B2
(45) Date of Patent: Oct. 14, 2025

(54) METHOD FOR MEASURING PROPERTIES OF ANODE SLURRY

(71) Applicant: LG Energy Solution, Ltd., Seoul (KR)

(72) Inventors: Jihee Yoon, Daejeon (KR); Seung Hyuk Kwon, Daejeon (KR); Wooha Kim, Daejeon (KR); Sung Soo Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 291 days.

(21) Appl. No.: 18/028,797

(22) PCT Filed: Jan. 18, 2022

(86) PCT No.: PCT/KR2022/000907
§ 371 (c)(1),
(2) Date: Mar. 28, 2023

(87) PCT Pub. No.: WO2022/231093
PCT Pub. Date: Nov. 3, 2022

(65) Prior Publication Data
US 2023/0288317 A1    Sep. 14, 2023

(30) Foreign Application Priority Data

Apr. 26, 2021    (KR) .................. 10-2021-0053607

(51) Int. Cl.
*G01N 19/00* (2006.01)
*G01N 11/00* (2006.01)
*G01N 11/10* (2006.01)

(52) U.S. Cl.
CPC ............. *G01N 19/00* (2013.01); *G01N 11/10* (2013.01); *G01N 2011/0026* (2013.01); *G01N 2011/0033* (2013.01)

(58) Field of Classification Search
CPC ................... G01N 19/00; G01N 11/10; G01N 2011/0026; G01N 2011/0033
See application file for complete search history.

(56) References Cited

U.S. PATENT DOCUMENTS

| 6,017,084 A * | 1/2000 | Carroll, III | ............. F16F 7/121 |
| | | | 296/187.05 |
| 2015/0004473 A1* | 1/2015 | Lim | ...................... H01M 4/587 |
| | | | 429/160 |

(Continued)

FOREIGN PATENT DOCUMENTS

| CN | 207096035 U | 3/2018 |
| CN | 207439864 U | 6/2018 |

(Continued)

OTHER PUBLICATIONS

International Search Report for Application No. PCT/KR2022/000907 mailed May 9, 2022, 2 pages.

(Continued)

*Primary Examiner* — Paul M. West
(74) *Attorney, Agent, or Firm* — Lerner David LLP (57) ABSTRACT

A method for measuring the properties of an anode slurry, including preparing a kneaded anode slurry, measuring an insertion length of a measuring bar, and calculating a kneading energy of the anode slurry. Specifically, the method being capable of evaluating the degree of adsorption among a conductive material, an active material, and carboxy methyl cellulose (CMC) in a kneaded state of the anode slurry.

11 Claims, 7 Drawing Sheets

(56) References Cited

U.S. PATENT DOCUMENTS

| | | |
|---|---|---|
| 2016/0084752 A1 | 3/2016 | Onoda |
| 2018/0191019 A1 | 7/2018 | Son et al. |
| 2020/0212430 A1 | 7/2020 | Lim et al. |

FOREIGN PATENT DOCUMENTS

| | | | |
|---|---|---|---|
| CN | 111551523 A | | 8/2020 |
| CN | 211402042 U | | 9/2020 |
| CN | 211652393 U | | 10/2020 |
| CN | 112072064 A | | 12/2020 |
| CN | 212844853 U | | 3/2021 |
| JP | S60-44850 A | | 3/1985 |
| JP | H08160036 A | | 6/1996 |
| JP | 2006134716 A | | 5/2006 |
| JP | 2010218918 A | * | 9/2010 |
| JP | 2016036835 A | | 3/2016 |
| KR | 20160033613 A | | 3/2016 |
| KR | 20170114418 A | | 10/2017 |
| KR | 20190036976 A | | 4/2019 |
| KR | 20190044558 A | | 4/2019 |
| WO | 2019-235133 A1 | | 12/2019 |

OTHER PUBLICATIONS

Extended European Search Report for Application No. 22795927.7 dated Feb. 12, 2024. 12 pgs.

* cited by examiner

METHOD FOR MEASURING PROPERTIES OF ANODE SLURRY

CROSS-REFERENCE TO RELATED APPLICATIONS

The present application is a national phase entry under 35 U.S.C. § 371 of International Application No. PCT/KR2022/000907 filed on Jan. 18, 2022 which claims priority from Korean Patent Application No. 10-2021-0053607, filed on Apr. 26, 2021, all of which are incorporated herein by reference.

TECHNICAL FIELD

The present disclosure relates to a method for measuring physical properties of an anode slurry, and specifically, to a method for measuring physical properties of an anode slurry capable of evaluating the degree of adsorption between a conductive material, an active material, and carboxy methyl cellulose (CMC) in a kneaded anode slurry.

BACKGROUND ART

In a secondary battery, a negative electrode can be prepared by mixing an active material, a conductive material, a binder, and a thickener to produce an anode slurry, applying the resulting anode slurry to a current collector, and pressing, sitting and drying the current collector coated with the anode slurry.

To improve battery performance and electrode productivity, it is necessary to improve a solid content of an anode slurry. However, as the solid content of the anode slurry increases, dispersion becomes more difficult.

Since carboxy methyl cellulose (CMC) acts as a dispersing agent and thickener in dispersing the anode slurry, the degree of dispersion between the active material, the conductive material and the CMC may affect the physical properties of the final slurry.

Therefore, there is a need for a method for evaluating physical properties of an anode slurry for improving the dispersibility of the anode slurry during the preparation of the anode slurry.

DETAILED DESCRIPTION

Technical Problem

An object of the present technology is to provide a method for measuring physical properties of an anode slurry, and specifically, a method for measuring physical properties of an anode slurry capable of evaluating the degree of adsorption between a conductive material, an active material, and CMC (carboxy methyl cellulose) in a kneaded anode slurry.

The technical problems to be achieved by the present technology are not limited to the technical problems mentioned above, and other technical problems not mentioned will be clearly understood by those of ordinary skill in the art to which the present technology belongs from the description below.

Solution to Problem

The method for measuring physical properties of an anode slurry of the present disclosure may comprise:
 (S1) preparing a kneaded anode slurry containing CMC (carboxy methyl cellulose) as a thickener;
 (S2) inserting one end of a measuring bar into the kneaded anode slurry and measuring an insertion length of the measuring bar inserted into the kneaded anode slurry and load values corresponding to the insertion length; and
 (S3) integrating the load values corresponding to the insertion length measured in step S2 to calculate a kneading energy.

Effect of the Technology

The method for measuring physical properties of an anode slurry of the present technology can measure physical properties of a kneaded state of the anode slurry, evaluate the degree of adsorption between a conductive material, an active material, and CMC, and finally improve dispersibility of the anode slurry.

The method for measuring physical properties of an anode slurry of the present technology can improve dispersibility of the anode slurry and improve the electrode coating issue and the electrode surface defect rate caused by the lowered dispersibility, by measuring physical properties of the anode slurry related to the dispersibility of the anode slurry.

BEST MODE FOR CARRYING OUT THE INVENTION

The method for measuring physical properties of an anode slurry of the present technology may comprise:
 (S1) preparing a kneaded anode slurry containing CMC (carboxy methyl cellulose) as a thickener;
 (S2) inserting one end of a measuring bar into the kneaded anode slurry and measuring an insertion length of the measuring bar inserted into the kneaded anode slurry and load values corresponding to the insertion length; and
 (S3) integrating the load values corresponding to the insertion length measured in step S2 to calculate a kneading energy.

In the method for measuring physical properties of the anode slurry of the present technology, the step S1 may comprise:
 (S1-1) preparing a preliminary slurry comprising an anode active material, a conductive material, CMC, a binder and a solvent; and
 (S1-2) stirring the preliminary slurry to prepare a kneaded anode slurry.

In step S1-1 of the method for measuring physical properties of the anode slurry of the present technology, the CMC may be present in an amount of 0.5 to 2 parts by weight based on 100 parts by weight of the anode active material.

In the method for measuring physical properties of the anode slurry of the present technology, the step S2 may comprise:
- (S2-1) preparing the anode slurry to have a set standard;
- (S2-2) mounting the anode slurry on a measuring instrument;
- (S2-3) inserting one end of a measuring bar into the kneaded anode slurry; and
- (S2-4) collecting load values corresponding to the insertion length of the measuring bar inserted into the anode slurry.

In step S2-1 of the method for measuring physical properties of the anode slurry of the present technology, the anode slurry may be prepared in the form of a cylindrical rod, and the set standard of the cylindrical rod may have a diameter of 2 cm to 2.5 cm and a height of 4 cm to 5 cm.

In step S2-3 of the method for measuring physical properties of the anode slurry of the present technology, the measuring bar may be formed of a stainless steel.

In step S2-3 of the method for measuring physical properties of the anode slurry of the present technology, the measuring bar may move in the longitudinal direction of the measuring bar to be inserted into the anode slurry, and the measuring bar may be inserted into the anode slurry at a speed of 0.5 to 2 mm/s.

In step S2-3 of the method for measuring physical properties of the anode slurry of the present technology, the one end of the measuring bar may be formed to include an inclined surface with respect to the longitudinal direction of the measuring bar.

MODE FOR CARRYING OUT THE INVENTION

Hereinafter, embodiments according to the present invention will be described in detail with reference to the accompanying drawings. In this process, the size or shape of the components shown in the drawings may appear exaggerated for clarity and convenience of description. In addition, the terms specially defined considering the configuration and operation of the present technology may vary depending on the intention or practices of a user or operator. Definition of these terms should be made based on the contents throughout the specification.

Figure 1:
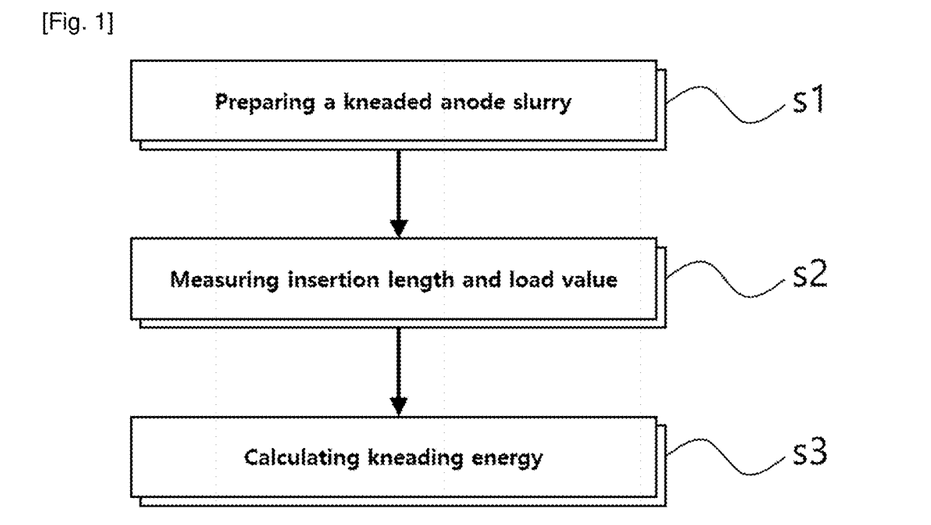
FIG. 1 is a block diagram illustrating a method for measuring physical properties of an anode slurry according to the present technology.
Figure 2:
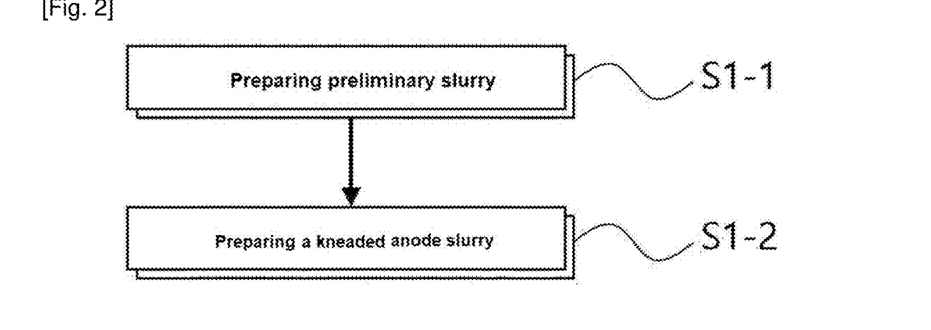
FIG. 2 is a block diagram showing step S1.
Figure 3:
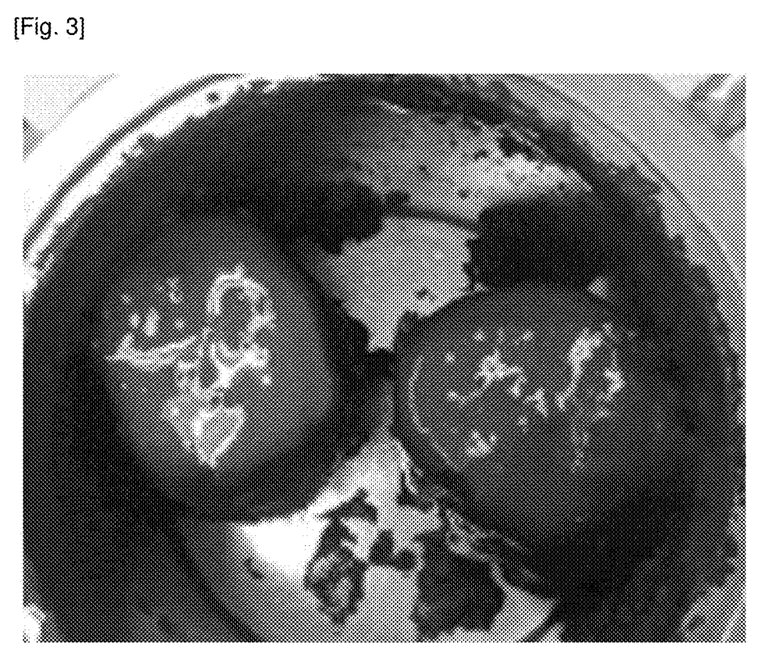
FIG. 3 is a photograph showing a kneaded state of the anode slurry.
Figure 4:
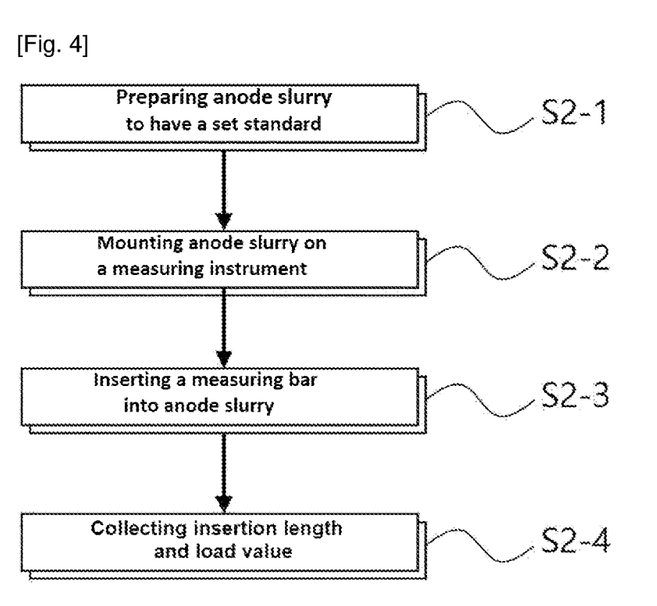
FIG. 4 is a block diagram showing step S2.
Figure 5:
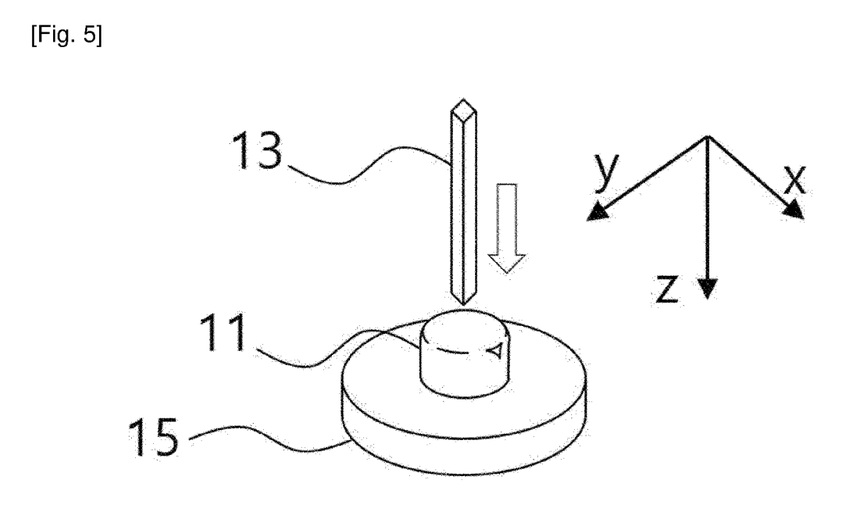
FIG. 5 is a conceptual diagram illustrating a measurement system in step S2.
Figure 6:
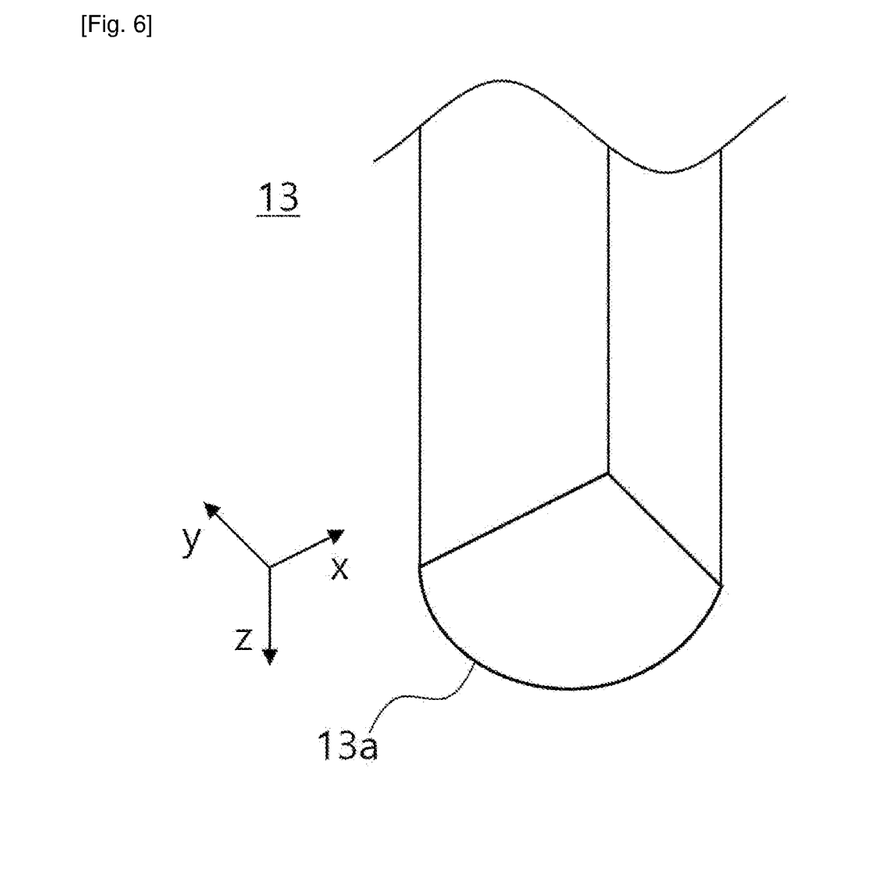
FIG. 6 is a perspective view showing the measuring bar in step S2.
Figure 7:
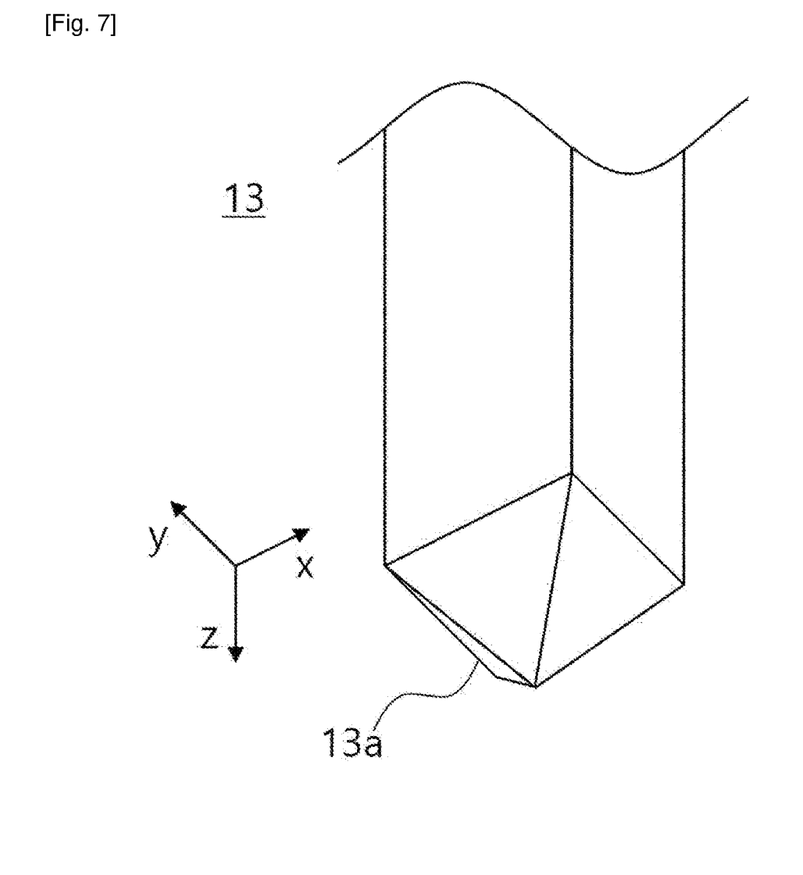
FIG. 7 is a perspective view showing other embodiment of the measuring bar in step S2.
Figure 8:
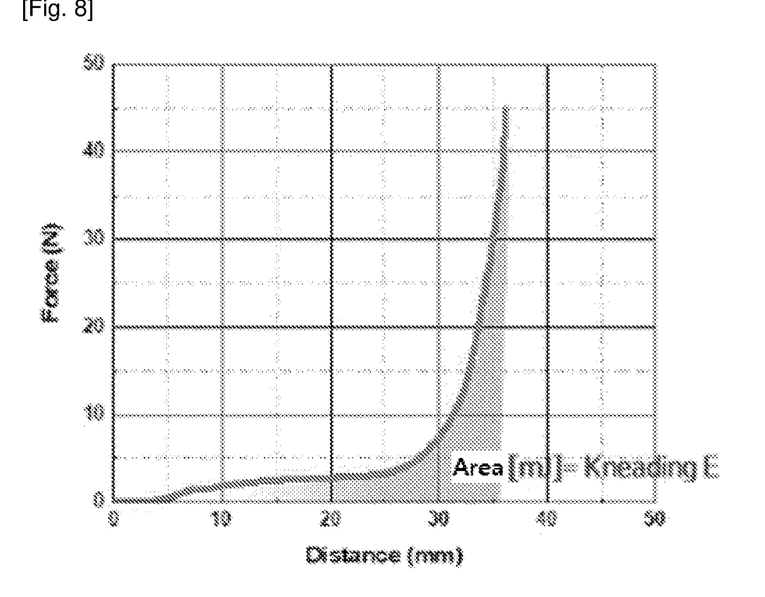
FIG. 8 is a graph of load against an insertion length.

FIG. 1 is a block diagram illustrating a method for measuring physical properties of an anode slurry according to the present technology. FIG. 2 is a block diagram showing step S1. FIG. 3 is a photograph showing a kneaded state of the anode slurry. FIG. 4 is a block diagram showing step S2. FIG. 5 is a conceptual diagram illustrating a measurement system in step S2. FIG. 6 is a perspective view showing the measuring bar in step S2. FIG. 7 is a perspective view showing another embodiment of the measuring bar in step S2. FIG. 8 is a graph of load against an insertion length.

Hereinafter, the method for measuring physical properties of the anode slurry of the present technology will be described in detail with reference to FIG. 1 to FIG. 8.

The method for measuring physical properties of the anode slurry of the present technology can achieve data for evaluating the degree of adsorption between the conductive material, the active material and the CMC, by measuring the physical state of the kneaded anode slurry and finally obtain data for improving dispersibility of the anode slurry.

The method for measuring physical properties of an anode slurry of the present technology can improve dispersibility of the anode slurry and improve the electrode coating issue and the electrode surface defect rate caused by the lowered dispersibility, by obtaining a kneading energy which is a physical property of the anode slurry related to the dispersibility of the anode slurry.

As shown in FIG. 1, the method for measuring physical properties of the anode slurry of the present technology may comprise the steps of:
- (S1) preparing a kneaded anode slurry containing CMC (carboxy methyl cellulose) as a thickener;
- (S2) inserting one end of a measuring bar into the kneaded anode slurry and measuring an insertion length of the measuring bar inserted into the kneaded anode slurry and load values corresponding to the insertion length; and
- (S3) integrating the load values corresponding to the insertion length measured in step S2 to calculate a kneading energy.

Since CMC acts as a dispersant and thickener in dispersing the anode slurry, the degree of dispersion between the active material, the conductive material and the CMC may affect the physical property of the final anode slurry. The method for measuring physical properties of the anode slurry of the present technology can evaluate dispersion characteristics of the anode slurry by measuring physical properties of the anode slurry.

As shown in FIG. 2, the step S1 of the method for measuring physical properties of the anode slurry of the present technology may comprise:
- (S1-1) preparing a preliminary slurry comprising an anode active material, a conductive material, the CMC, a binder and a solvent; and
- (S1-2) stirring the preliminary slurry to prepare a kneaded anode slurry.

In step S1-1, the anode active material may be a lithium metal, a carbon material, a metal compound, or a mixture thereof, in which lithium ions can be occluded and released.

Specifically, as the carbon material, both low crystalline carbon and high crystalline carbon may be used. The low crystalline carbon includes soft carbon and hard carbon, and the high crystalline carbon includes natural graphite, Kishgraphite, pyrolytic carbon, mesophase pitch based carbon fiber, meso carbon microbeads, Mesophase pitches, and high-temperature calcined carbon such as petroleum or coal tar pitch derived cokes.

The metal compound includes compounds containing at least one of metal elements such as Si, Ge, Sn, Pb, P, Sb, Bi, Al, Ga, In, Ti, Mn, Fe, Co, Ni, Cu, Zn, Ag, Mg, Sr, and Ba. These metal compounds can be used in any form, such as simple substances, alloys, oxides ($TiO_2$, $SnO_2$, etc.), nitrides, sulfides, borides, alloys with lithium, etc. Simple substances, alloys, oxides, alloys with lithium can have a high capacity. Of these, one or more elements selected from Si, Ge, and Sn may be included. The inclusion of one or more elements selected from Si and Sn may further increase capacity of the battery.

In step S1-1, the conductive material is not particularly limited as long as it has conductivity without causing a chemical change in the battery. It includes, for example, one or more independently selected from the group of graphite such as natural graphite and artificial graphite; carbon black, such as carbon black, acetylene black, Ketjen black, channel black, furnace black, lamp black, and summer black; conductive fibers such as carbon fibers and metal fibers; metal powders such as carbon fluoride, aluminum, and nickel powders; conductive whiskers such as zinc oxide and potassium titanate; conductive oxides such as titanium oxide;

polyphenylene derivative carbon nanotube (CNT), carbon nanofiber (CNF) and graphene carbon derivative. It is preferred to use carbon black.

In the step S1-1, the binder may include, for example, one or more selected from the group consisting of styrene butadiene rubber (SBR), acrylonitrile-butadiene rubber, acrylonitrile-butadiene-styrene rubber, acrylic copolymer, PEI (polyethylene imide), PVA (polyvinyl alcohol), PEO (polyethylene oxide), polyacrylic acid and polymers in which hydrogen is substituted with Li, Na or Ca, etc., and preferably, styrene butadiene rubber (SBR) may be used. The water-based binder may have a weight average molecular weight of 200,000 to 700,000, preferably 300,000 to 400,000. The binder having the above molecular weight range has excellent bonding properties and an appropriate viscosity, which is advantageous for the preparation of a slurry having the solid content uniformly distributed and ultimately contributes to securing excellent battery performance.

In step S1-1, the CMC may be present in an amount of 0.1 to 5 parts by weight based on 100 parts by weight of the anode active material. For example, a mixture of the anode active material, the conductive material, the binder and the thickener may contain 92 to 99 parts by weight of the anode active material, 0.5 to 2 parts by weight of the conductive material, 0.5 to 4 parts by weight of the water-based binder, and 0.5 to 2 parts by weight of the CMC.

In step S2-1, the anode slurry may be kneaded at 40 to 80 rpm for 30 minutes. For example, the anode slurry may be obtained by stirring the preliminary slurry with TK mixer manufactured by PRIMIX. As shown in FIG. 3, when step S2-1 is completed, the anode slurry may be formed in the form of a cylindrical rod. In FIG. 3, the anode slurry is formed in the form of two rods.

As shown in FIG. 4, in the method for measuring physical properties of the anode slurry of the present technology, the step S2 may comprise:
 (S2-1) preparing the anode slurry to have a set standard;
 (S2-2) mounting the anode slurry on a measuring instrument;
 (S2-3) inserting one end of a measuring bar into the kneaded anode slurry; and
 (S2-4) collecting load values corresponding to the insertion length of the measuring bar inserted into the anode slurry.

In step S2-1, the anode slurry may be prepared in the form of a cylindrical rod, and the set standard of the cylindrical rod may have a diameter of 2 cm to 2.5 cm and a height of 4 cm to 5 cm. The set standard of the anode slurry may be selected in a range in which the amount or shape of the anode slurry does not affect the measurement.

As shown in FIG. 5, in step S2-2, the measuring instrument may comprise a measuring bar 13 inserted into the anode slurry 11, and a support 15 for supporting the anode slurry. For example, the measuring instrument may be TA (Texture Analyzer). The support 15 may comprise a mounting surface that is a plane perpendicular to the longitudinal direction (z-axis direction) of the measuring bar 13, and the anode slurry may be mounted on the mounting surface.

In step S2-3, the measuring bar 13 may be formed of a stainless material. The material of the measuring bar 13 may be determined in consideration of rigidity and chemical resistance.

As shown in FIG. 5, in step S2-3, the measuring bar 13 may move along the longitudinal direction of the measuring bar 13 and inserted into the anode slurry, and the measuring bar 13 may be inserted into the anode slurry at a speed of 0.5 to 2 mm/s. The insertion speed of the measuring bar 13 may be determined in consideration of the resolution between the measuring device and the sample. For example, the insertion speed of the measuring bar 13 may be 1 mm/s.

In step S2-3, the area of the cross-section of the measuring bar 13 perpendicular to the longitudinal direction of the measuring bar 13 may be 1 $mm^2$ to 100 $mm^2$. For example, the cross-section of the measuring bar 13 has a square shape in a size of 5 mm×5 mm. The shape and size of the cross-section of the measuring bar 13 may be selected in consideration of the size (set standard) of the anode slurry accommodated in TK mixer.

As shown in FIGS. 6 and 7, the one end of the measuring bar 13 may be formed to include an inclined surface with respect to the longitudinal direction of the measuring bar 13. Specifically, the one end 13a of the measuring bar may be formed in a triangular pyramid, a quadrangular pyramid, a polygonal pyramid, a hemisphere, a cone, or the like. The portion most protruding from the one end 13a of the measuring bar may be located at the center in the cross section of the measuring bar 13 perpendicular to the longitudinal direction of the measuring bar 13. By providing the one end 13a of the measuring bar in the above shape, the measuring bar 13 may be inserted into a proper position without deviation when inserted into the anode slurry having a relatively high viscosity.

In step S2-4, load values applied to the measuring bar or the anode slurry according to the insertion length of the measuring bar may be measured. The load value may be obtained as a value corresponding to each insertion length from beginning to end of the insertion of the measuring bar. Accordingly, as shown in FIG. 8, the value obtained in step S2-4 may be obtained as a two-dimensional graph of the insertion length-load value. That is, in step S2-4, there may be obtained a function in which the insertion length is an independent variable and the load value is a dependent variable.

In step S3, the kneading energy value may be obtained by integrating load values obtained in step S2-4 with the insertion length. In step S3, the integration range may be from an insertion length value when the measured load value becomes 0 or more to an insertion length value when the load value becomes a maximum value.

The kneading energy may have a relationship between the degree of dispersion between an active material, a conductive material and CMC and the filtering properties. Therefore, it can be determined that the greater the kneading energy, the better the dispersion of the anode slurry is. The filtering properties may relate to whether or not to pass through a filter that filters out particles of a certain size.

Example 1

An artificial graphite anode active material was prepared. Then, CNT as a conductive material, carboxymethyl cellulose (CMC, molecular weight 1,200,000) as a thickener, and styrene butadiene rubber (SBR) as a binder were prepared, and the anode active material, the conductive material, the CMC and the binder were mixed in a weight ratio of 96.1:0.5:1.1:2.3. and mixed with water as a solvent to prepare a preliminary slurry.

The preliminary slurry comprises a first preliminary slurry and a second preliminary slurry, wherein the first preliminary slurry comprises the conductive material, the CMC, the anode active material, and water, and the second preliminary slurry comprises the CMC, water and the binder. The CMOs in the first preliminary slurry and the second preliminary slurry were distributed in a weight ratio of 66.1:33.9.

The preliminary slurry was stirred for 30 minutes at 60 rpm with TK mixer. The first preliminary slurry was first stirred, and then the second preliminary slurry was added with stirring.

A measuring bar of 5 mm×5 mm×100 mm was inserted into the prepared anode slurry at a speed of 1 mm/s to measure an insertion depth and a load value.

In Example 1, the kneading energy was calculated to be 187.9 mJ.

Example 2

In Example 2, the same procedure as in Example 1 was performed except that the CMOs in the first preliminary slurry and the second preliminary slurry were distributed in a weight ratio of 60.9:39.1.

In Example 2, the kneading energy was calculated to be 253.7 mJ.

TABLE 1

|  | Example 1 | Example 2 |
|---|---|---|
| Composition of anode slurry | Artificial graphite/conductive material/CMC/SBR = 96.1/0.5/1.1/2.3 | |
| CMC ratio in the first pre-slurry and the second pre-slurry | 66.1/33.9 | 60.9/39.1 |
| Kneading energy [mJ] | 187.9 | 253.7 |
| Passing through Cobetter RK (150 μm) filter | X | ○ |

In the anode slurry of Example 1 and the anode slurry of Example 2, each of the kneading energy was calculated to be 187.9 mJ and 253.7 mJ. It is found that the anode slurry of Example 2 having a larger kneading energy was better dispersed as it passed through Cobetter RK (150 μm) filter. The Cobetter RK (150 μm) filter filters out agglomerated particles with the size of 150 μm or more that can cause defects in electrode production. Through the calculation of the kneading energy, it is possible to screen the same as the anode slurry in Example 1 in advance.

Although the embodiments according to the present invention have been described above, these are merely exemplary, and those of ordinary skill in the art will understand that various modifications and equivalent ranges of embodiments are possible therefrom. Accordingly, the true technical protection scope of the present technology should be defined by the following claims.

INDUSTRIAL APPLICABILITY

The method for measuring physical properties of an anode slurry of the present technology can measure physical properties of a kneaded state of the anode slurry, evaluate the degree of adsorption between a conductive material, an active material, and CMC, and finally improve dispersibility of the anode slurry.

The method for measuring physical properties of an anode slurry of the present technology can improve dispersibility of the anode slurry and improve the electrode coating issue and the electrode surface defect rate caused by the lowered dispersibility, by measuring physical properties of the anode slurry related to the dispersibility of the anode slurry.

The invention claimed is:

1. A method for measuring physical properties of an anode slurry, comprising:
    (S1) preparing a kneaded anode slurry containing CMC (carboxy methyl cellulose) as a thickener;
    (S2) inserting a first end of a measuring bar into the kneaded anode slurry and measuring an insertion length of the measuring bar inserted into the kneaded anode slurry and further measuring load values corresponding to the insertion length; and
    (S3) integrating the measured load values corresponding to the measured insertion length to calculate a kneading energy, and determining a dispersion characteristic of the anode slurry based on the kneading energy.

2. The method of claim 1, wherein the preparing the kneaded anode slurry (S1) comprises:
    (S1-1) preparing a preliminary slurry comprising an anode active material, a conductive material, CMC, a binder and a solvent; and
    (S1-2) stirring the preliminary slurry to prepare the kneaded anode slurry.

3. The method of claim 2, wherein the (S1-2) comprises kneading the anode slurry in a range of 40 rpm to 80 rpm.

4. The method of claim 2, wherein the CMC during the preparing of the preliminary slurry (S1-1) is present in an amount of 0.5 to 2 parts by weight based on 100 parts by weight of the anode active material.

5. The method of claim 4, wherein the (S2) comprises:
    (S2-1) preparing the anode slurry to have a set standard;
    (S2-2) mounting the anode slurry on a measuring instrument;
    (S2-3) inserting the first end of the measuring bar into the kneaded anode slurry; and
    (S2-4) collecting load values corresponding to the insertion length of the measuring bar inserted into the anode slurry.

6. The method of claim 5, wherein during the preparing the anode slurry to have the set standard (S2-1), the anode slurry is prepared in a form of a cylindrical rod, and the set standard of the cylindrical rod has a diameter of 2 cm to 2.5 cm and a height of 4 cm to 5 cm.

7. The method of claim 5, wherein the measuring bar is formed of a stainless steel.

8. The method of claim 5, wherein during the inserting the measuring bar (S2-3) the measuring bar moves in a longitudinal direction of the measuring bar to be inserted into the anode slurry, and the measuring bar is inserted into the anode slurry at a speed of 0.5 to 2 mm/s.

9. The method of claim 8, wherein during the inserting the measuring bar (S2-3) the first end of the measuring bar is formed to include an inclined surface with respect to the longitudinal direction of the measuring bar.

10. The method of claim 1, wherein in the determining the dispersion characteristic of the anode slurry, the kneading energy is in a range from 187.9 mJ to 253.8 mJ.

11. The method of claim 1, wherein an area of a cross-section of the measuring bar perpendicular to a longitudinal direction of the measuring bar is in a range from 1 mm$^2$ to 100 mm$^2$.

* * * * *